(12) United States Patent
Whalen et al.

(10) Patent No.: US 9,676,401 B2
(45) Date of Patent: Jun. 13, 2017

(54) SLACK ADJUSTER CONTAMINANT SUMP, DRAIN, AND OVERLOAD RELIEF

(71) Applicant: WABTEC Holding Corp., Wilmerding, PA (US)

(72) Inventors: Shaun T. Whalen, Chicago, IL (US); Peter Paul Gregar, Chesterton, IN (US); Scott Lee Natschke, Bourbonnais, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 10 days.

(21) Appl. No.: 14/315,459

(22) Filed: Jun. 26, 2014

(65) Prior Publication Data

US 2015/0075924 A1 Mar. 19, 2015

Related U.S. Application Data

(60) Provisional application No. 61/841,523, filed on Jul. 1, 2013.

(51) Int. Cl.
*F16D 65/56* (2006.01)
*B61H 15/00* (2006.01)
(Continued)

(52) U.S. Cl.
CPC ......... *B61H 15/0057* (2013.01); *B61H 15/00* (2013.01); *F16D 65/0025* (2013.01); *F16D 65/66* (2013.01)

(58) Field of Classification Search
CPC . B60T 7/08; B60T 11/06; B60T 7/108; F16D 65/66; F16D 65/56; F16D 65/38;
(Continued)

(56) References Cited

U.S. PATENT DOCUMENTS 3,520,387 A 7/1970 Natschke
3,595,347 A 7/1971 Billeter
(Continued)

FOREIGN PATENT DOCUMENTS

KR 10-2008-0054613 6/2008
WO 2012174505 A1 12/2012

OTHER PUBLICATIONS

Reclamation Manual for Ellcon National Model D-2000 Series Slack Adjuster, Nov. 20, 2008, 19 pages.
(Continued)

*Primary Examiner* — Pamela Rodriguez
(74) *Attorney, Agent, or Firm* — The Webb Law Firm

(57) ABSTRACT

A drainage system for use with a slack adjuster for a railway brake rigging. The drainage system allows fluid and other contaminants to drain from the slack adjuster to prevent the fluid and contaminants from accumulating within the slack adjuster, contacting an operating area of the slack adjuster, and interfering with the operation of the slack adjuster. The slack adjuster includes a main housing portion, a cone nut housing portion enclosing a critical operating area of the slack adjuster, and an overtravel housing portion. The drainage system includes at least one aperture extending through a sidewall portion of the overtravel housing portion. The at least one aperture is configured to allow fluid and/or contaminants to drain there through to reduce exposure of the critical operating area to fluid and/or contaminants. A plug and/or patch can be provided to sealingly and/or removably engage the at least one aperture.

31 Claims, 12 Drawing Sheets

(51) Int. Cl.
*F16D 65/00* (2006.01)
*F16D 65/66* (2006.01)

(58) Field of Classification Search
CPC . F16D 65/0025; B61H 15/00; B61H 15/0057; B61H 15/0028
USPC .......................... 188/202, 196 D, 196 R, 197
See application file for complete search history.

(56) References Cited

U.S. PATENT DOCUMENTS

| | | | |
|---|---|---|---|
| 4,662,485 A | 5/1987 | Kanjo et al. | |
| 4,683,991 A | 8/1987 | Kanjo | |
| 4,796,731 A | 1/1989 | Schmitt | |
| 5,025,900 A | 6/1991 | Severinsson | |
| 5,476,269 A * | 12/1995 | Karlsson | B61H 15/00 188/198 |
| 5,615,755 A | 4/1997 | Karlsson | |
| 5,975,254 A * | 11/1999 | Emilsson | B61H 15/00 188/196 R |
| 7,802,662 B2 | 9/2010 | Sommerfeld et al. | |
| 9,272,718 B2 * | 3/2016 | Huber, Jr. | B61H 15/0028 |
| 2009/0065312 A1 | 3/2009 | Sommerfeld et al. | |
| 2010/0320044 A1* | 12/2010 | Emilsson | F16D 65/56 188/202 |
| 2012/0068454 A1 | 3/2012 | Hamaguchi et al. | |
| 2015/0233435 A1* | 8/2015 | Huber, Jr. | F16D 65/0025 188/153 R |

OTHER PUBLICATIONS

New York Air Brake Technical Guide for the Product User KDR-482-E Slack Adjuster, Jul. 2010, 2 pages.
Cardwell Westinghouse Model Sheet for Universal Slack Adjusters Model 2300-DJ, C1000, Model 5, Model 5D, Model 85, Oct. 11, 2011, 3 pages.

* cited by examiner

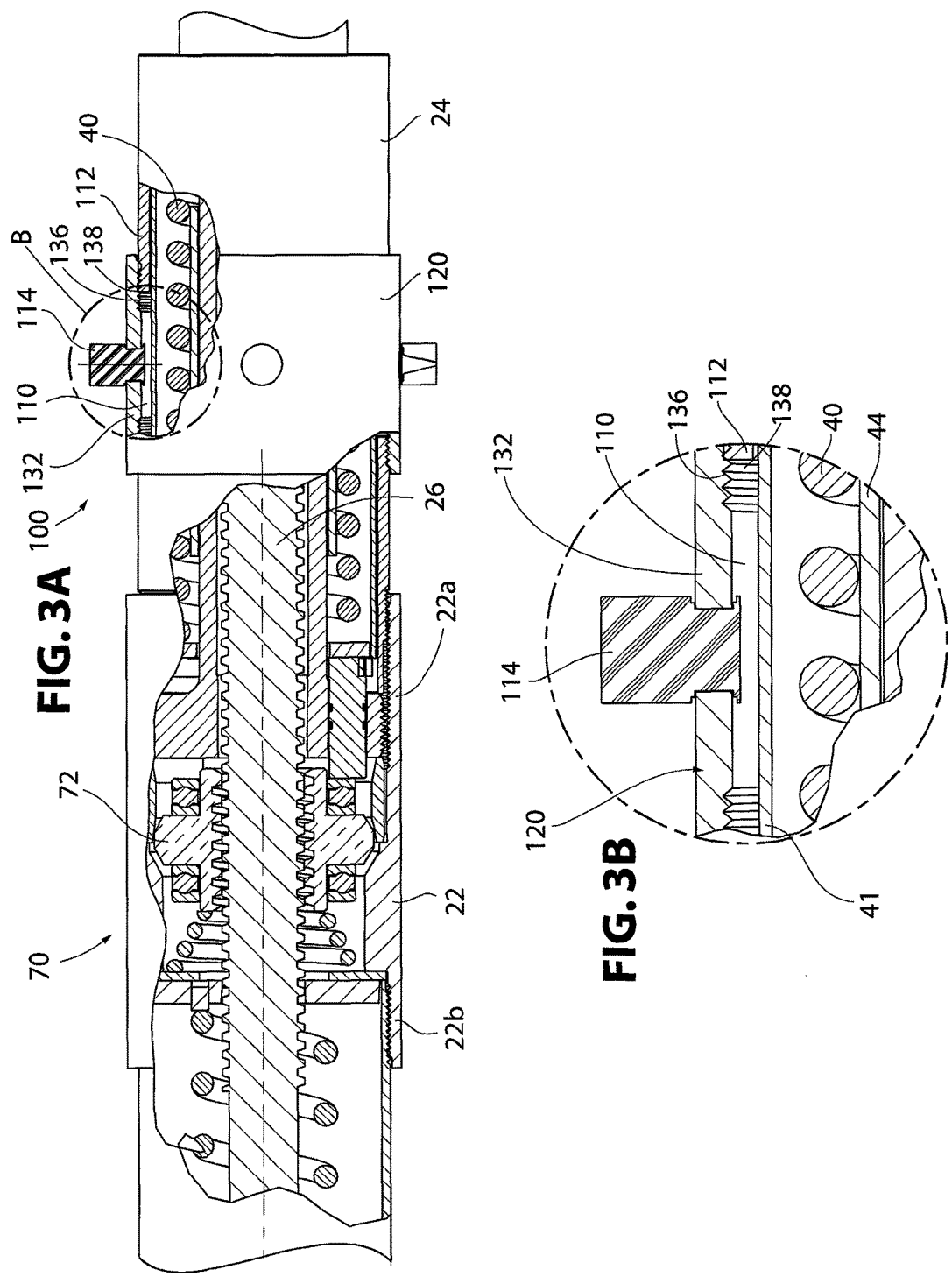

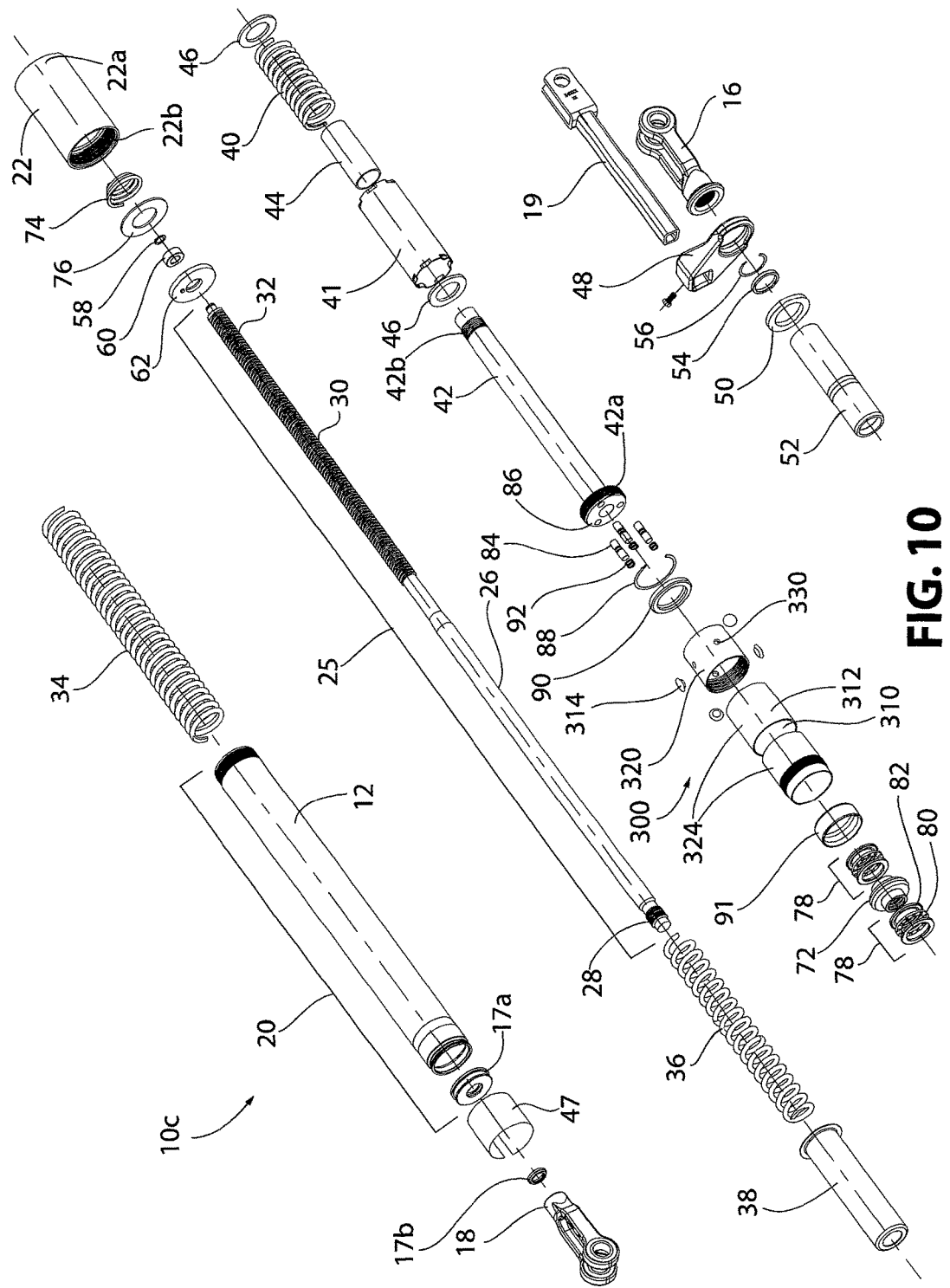

SLACK ADJUSTER CONTAMINANT SUMP, DRAIN, AND OVERLOAD RELIEF

CROSS REFERENCE TO RELATED APPLICATION

This application is based upon U.S. Provisional Patent Application Ser. No. 61/841,523 entitled Slack Adjuster Contaminant Sump, Drain, and Overload Relief, filed Jul. 1, 2013, which is hereby incorporated by reference in its entirety.

BACKGROUND OF THE INVENTION

Field of the Invention

The present disclosure is directed to a slack adjuster which automatically adjusts the slack in the brake rigging of a railway vehicle, and further particularly, to a slack adjuster including a drainage system through which fluid, such as water and other contaminants can drain to prevent the fluid and contaminants from accumulating within the slack adjuster, contacting the critical operating area of the slack adjuster, and interfering with the operation of the slack adjuster.

Description of Related Art

Slack adjuster assemblies have been employed in brake riggings to compensate for slack caused by wear induced in the brake pads, wheels, and other components in brake rigging during repeated braking applications. By controlling this slack, the brake piston travel is automatically maintained at the correct length to ensure maximum efficiency in the brake system. The slack adjuster is also used to automatically adjust the slack in the brake rigging for various other reasons. One reason is to maintain the brake cylinder piston rod travel distance within a prescribed limit, which is of particular importance in present day higher speed operations. In addition, today's trains have a greater number of cars due to better locomotive equipment. For these reasons, it is important that the piston rod travel of the brake cylinder be maintained at a relatively close tolerance in order to properly balance the fluid pressure, usually air, in the fluid cylinder with that in the reservoir. Another important reason is that the slack adjusters will provide a substantially more uniform braking force to be applied to each set of wheels on each car making up a train.

One example of a slack adjuster that is used in a wide variety of railway applications is a double-acting, compression-type slack adjuster, which is described in U.S. Pat. No. 4,662,485 and is manufactured by the Assignee of the present disclosure. This slack adjuster assembly includes an elongated hollow housing member restrained against rotation and pivotally connectable at a first end thereof to a brake rigging. An elongated rod member, which is restrained against rotation and pivotally connectable at a first end thereof to the brake rigging, is provided within this housing and has at least a threaded portion adjacent a second end thereof. The threaded portion of the rod member extends into and is reciprocally movable within the housing through a second end of the housing. A positioning means, such as a cone lock nut located within a cone nut housing portion, movable between respective first abutting engagement, disengagement, and second abutting engagement positions, is threadedly engaged with the threaded portion of the rod member intermediate said ends thereof. The cone lock nut rotates about the threaded portion of the rod member when in the disengaged position, thereby changing the length of the slack adjuster assembly by changing the relative longitudinal position between the housing and the rod member. A pair of opposite facing abutment surfaces positioned within a portion of the housing and a pair of opposed abutting surfaces carried by the cone lock nut for engaging respective adjacent surfaces to resist rotation of the cone lock nut about the rod member when the cone lock nut is in one of the respective abutting engagement positions, thereby retarding the change in relative longitudinal position between the housing and the rod member are provided. A first urging means is positioned between the cone lock nut and an abutment surface carried by the rod member for urging the cone lock nut into the disengaged position. A second urging means is positioned between the first end of the housing and the cone lock nut for overcoming a force applied by the first urging means and for urging the cone lock nut into the first abutting relationship position. An overtravel control means located within an overtravel control housing is positioned to reciprocally move in a longitudinal direction adjacent the first end of the housing and is engageable with the second urging means for reducing the force applied by the second urging means to less than the force applied by the first urging means, thereby allowing the cone lock nut to move to the disengaged position. An overtravel control actuating means is positioned to engage the overtravel control means for actuating the overtravel control means in response to the travel distance of a brake cylinder piston connected to the brake rigging.

Other examples of slack adjusters include the Universal Model 2300-DJ, owned by the Assignee of the present disclosure, Ellcon National Model D-2000, and New York Air Brake Model KDR-482-E.

During use of the brake rigging, the slack adjuster is exposed to various environmental conditions, including conditions where the slack adjuster is exposed to large amounts of fluid, such as water. This water and other contaminants from the environment can accumulate and become trapped within the critical operating area and near critical components of the slack adjuster, which can compromise the functioning of the slack adjuster. In one example, such as in the Universal Model 2300-DJ, the critical operating area includes the cone nut, bearing race assembly, and the conical spring, all of which operate together to allow the slack adjuster to adjust the brake rigging of the railcars as needed. It can be appreciated that different slack adjuster designs may include additional and/or other components within the critical operating area.

Some slack adjuster designs include a wiper seal located within the overtravel control housing with the intended purpose of preventing all water from entering into the slack adjuster. However, when a slack adjuster is exposed to large amounts of water, this wiper seal can fail to block all of the water from entering into the critical operating area of the slack adjuster. Thus, in these instances, water and contaminates may enter into the critical operating area and deleteriously effect the components located therein, resulting in faulty operation of the slack adjuster. Accordingly, there is a need in the art to secure and seal the critical operating area to maintain optimal operation of the critical operating components of the slack adjuster by preventing accumulation of water and contaminants near the critical areas of the slack adjuster. The system for preventing this accumulation of water and protecting the critical operating area from contaminants, must be adaptable to all slack adjusters and orientations of installation, such that the slack adjuster can be used in a wide array of environmental conditions.

SUMMARY OF THE INVENTION

In accordance with an embodiment of the present disclosure, a drainage system is provided for use with a slack adjuster for a railway brake rigging. The drainage system allows fluid, such as water and other contaminants, such as dirt and debris, to drain from the slack adjuster to prevent the fluid and contaminants from accumulating within the slack adjuster, contacting an operating area or a critical operating area of the slack adjuster, and interfering with the operation of the slack adjuster. The slack adjuster includes a main housing portion, a cone nut housing portion enclosing a critical operating area of the slack adjuster, and an overtravel housing portion. The drainage system includes at least one aperture extending through a sidewall portion of the overtravel housing portion. The at least one aperture is configured to allow fluid and/or contaminates to drain through this at least one aperture to reduce exposure of the critical operating area to fluid and/or contaminants.

The critical operating area includes components configured to operate together to adjust the brake rigging. According to one design, the critical operating area can include a cone nut, at least one bearing race assembly, and a conical spring, all of which are configured to cooperate together to change a length of the slack adjuster by changing a relative longitudinal position between the main housing portion and a rod member located within the main housing portion. It can be appreciated that other slack adjuster designs can include different components within this critical operating area which cooperate together to operate the slack adjuster and the drainage system of the disclosure can be utilized to drain fluid and/or contaminants from the slack adjuster and prevent these fluids and/or contaminants from interfering with the operation of the slack adjuster.

The drainage system can include at least one plug extending through the at least one aperture. It can be appreciated that the plug can be a standard plug that is shaped to sealingly engage the aperture. According to one embodiment, the plug can be a one-way valve. According to another embodiment, the plug can be a rounded, low-profile plug extending through the at least one aperture. The rounded, low-profile plug provides advantages in terms of stacking and shipping of the slack adjusters and has a less chance of being damaged or broken during shipping and/or use of the slack adjuster.

Multiple apertures and plugs can be provided which extend about the periphery of the sidewall portion of the overtravel housing portion. The plug or one-way valve can be removable from the aperture. In some arrangements, the plug or one-way valve that is facing in the most downwardly direction can be removed after installation of the slack adjuster to facilitate drainage of fluid and/or contaminants through the bottom aperture. It can be appreciated that the plug can be formed from any well-known material or can have a removable cover formed from any known material. Also, the plug and/or cover can have various designs such as a threaded bolt/bolt arrangement, tape, shrink wrap, and the like.

According to one embodiment, the drainage system can also include a plug housing encompassing at least a portion of the overtravel housing portion. The plug housing can include at least one aperture extending through a sidewall portion in alignment with the at least one aperture extending through the sidewall portion of the overtravel housing portion. The plug housing can include threads for threadedly engaging a threaded portion of the overtravel housing portion. The at least one of a plug or one-way valve can extend through the aligned apertures. The at least one aperture extending through the overtravel housing sidewall portion and the at least one aperture extending through the plug housing sidewall portion can include multiple apertures aligned with one another and each of the aligned apertures can include at least one of a plug or a one-way valve extending therethrough.

According to another embodiment, the drainage system can be formed as a one-piece overtravel housing portion that includes the apertures configured for cooperating with the plugs and/or one-way valves, formed directly in the sidewall of the overtravel housing portion. This particular design would eliminate the need for a separate plug housing, which would reduce manufacturing and assembly costs. An end portion of the overtravel housing portion can include a notch and/or a protrusion configured to matingly engage the opposite of a notch and/or protrusion on the cone nut housing portion. Alternatively, the end portion of the overtravel housing portion can include threads to threadedly engage the cone nut housing portion.

In accordance with another embodiment of the disclosure, the at least one aperture extending through the sidewall portion of the overtravel housing portion can include a patch configured for covering the at least one aperture. The patch can be in the form of an adhesive tape, typically used in the railway industry. The at least one aperture can include multiple apertures located about, and extending through, the sidewall portion of the overtravel housing. After installation, the patch covering the most downwardly facing aperture can be removed to allow for fluid and/or contaminants to drain from the slack adjuster. It can be appreciated that any combination of plugs, one-way valves, and patches can be used to sealingly and/or removably engage the apertures in the drainage system.

One example of a slack adjuster that can include the drainage system of the disclosure is a double-acting tension actuatable slack adjuster. The double-acting slack adjuster includes an elongated hollow cylindrical housing member which is restrained against rotation and pivotally connectable at a first end thereof. The elongated hollow cylindrical housing includes a main housing portion, a cone nut housing portion, and an overtravel housing portion. The slack adjuster also includes an elongated rod member which is restrained against rotation and pivotally connectable at a first end thereof. The rod member has at least a portion thereof threaded, and this threaded portion of the rod member extends into the housing member through a second end of the housing member. A cone lock nut is threadedly engaged with the threaded portion of the rod member intermediate a first and second end thereof. The cone lock nut is axially movable for rotating about the threaded portion of the rod member to change the length of the slack adjuster assembly by changing the relative longitudinal position between the housing member and the rod member. This cone lock nut is located within the cone nut housing portion. At least a first spring is provided for urging the cone lock nut into a first position with respect to the housing member and a second spring is provided for overcoming a force applied by the first spring and for urging the cone lock nut into a second position. The drainage system includes at least one aperture extending through a sidewall portion of the overtravel housing portion. This at least one aperture is configured to allow fluid and/or contaminates to drain therethrough to reduce exposure of the critical operating area to fluid and/or contaminants. The slack adjuster further includes at least one of a patch, plug, and a one-way valve configured for cooperating with the at least one aperture. According to one embodiment, the plug can be a rounded, low-profile plug. Additionally, the overtravel housing portion, including the at least one aperture, can be a one-piece formed member.

A plug housing can be provided which is configured to encompass a portion of the overtravel housing. The plug housing includes at least one aperture in alignment with the aperture extending through the sidewall portion of the overtravel housing. The aligned apertures are configured to receive a plug or a one-way valve therein or to receive a patch thereover to cover the aperture. After installation, the most downwardly facing plug, one-way valve, or patch can be removed to facilitate drainage of fluid and/or contaminants from the slack adjuster.

In accordance with another embodiment, a method is provided for preventing the accumulation of water and/or contaminants within a slack adjuster and for protecting a critical operating area of the slack adjuster. The slack adjuster has at least a main housing portion, a cone nut housing portion enclosing the critical operating area of the slack adjuster, and an overtravel housing portion. The method includes providing at least one aperture extending through a sidewall portion of the overtravel housing portion. The at least one aperture is configured to allow fluid and/or contaminates to drain therethrough to reduce exposure of the critical operating area to fluid and/or contaminants. The at least one aperture can include multiple apertures located about the cylindrical overtravel housing portion, wherein the apertures are configured to receive a plug, one-way valve, and/or a patch. According to one embodiment, the plug can be a rounded, low-profile member. After installation of the slack adjuster, the plug, one-way valve, or patch can be removed from one or more of the downwardly facing apertures to facilitate drainage of fluid and/or contaminants from the slack adjuster.

The overtravel housing portion, including the at least one aperture, can be formed as a one-piece member. Alternatively, a plug housing can be provided, wherein the plug housing includes at least one aperture extending therethrough. The method further includes positioning the plug housing about a portion of the overtravel housing such that the at least one aperture in the plug housing is aligned with the at least one aperture extending through the sidewall portion of the overtravel housing.

It can be appreciated that the drainage system can be used with a variety of sealing members cooperating with one or all of the main housing portion, cone nut housing portion and overtravel housing portion to seal against the entrance of fluid and/or contaminates into the critical operating area and to protect the components located in the critical operating area of the slack adjuster. The sealing system can include sealing members located at a first end and a second end of the cone nut housing portion and the sealing members can be any of gaskets, O-rings, rubber sealant material, adhesive sealing compound, and the like.

BRIEF DESCRIPTION OF THE DRAWINGS

FIG. 3A is a partial cross-sectional view of the slack adjuster of FIG. 1, including the drainage system in accordance with an embodiment of the present disclosure;

FIG. 3B is an enlarged cross-sectional view of detail B of FIG. 3A, showing a portion of the drainage system in accordance with an embodiment of the present disclosure;

FIG. 10 is an expanded perspective view of the slack adjuster of FIG. 9, including the drainage system, in accordance with an embodiment of the present disclosure;

DETAILED DESCRIPTION OF THE INVENTION

Figure 1:
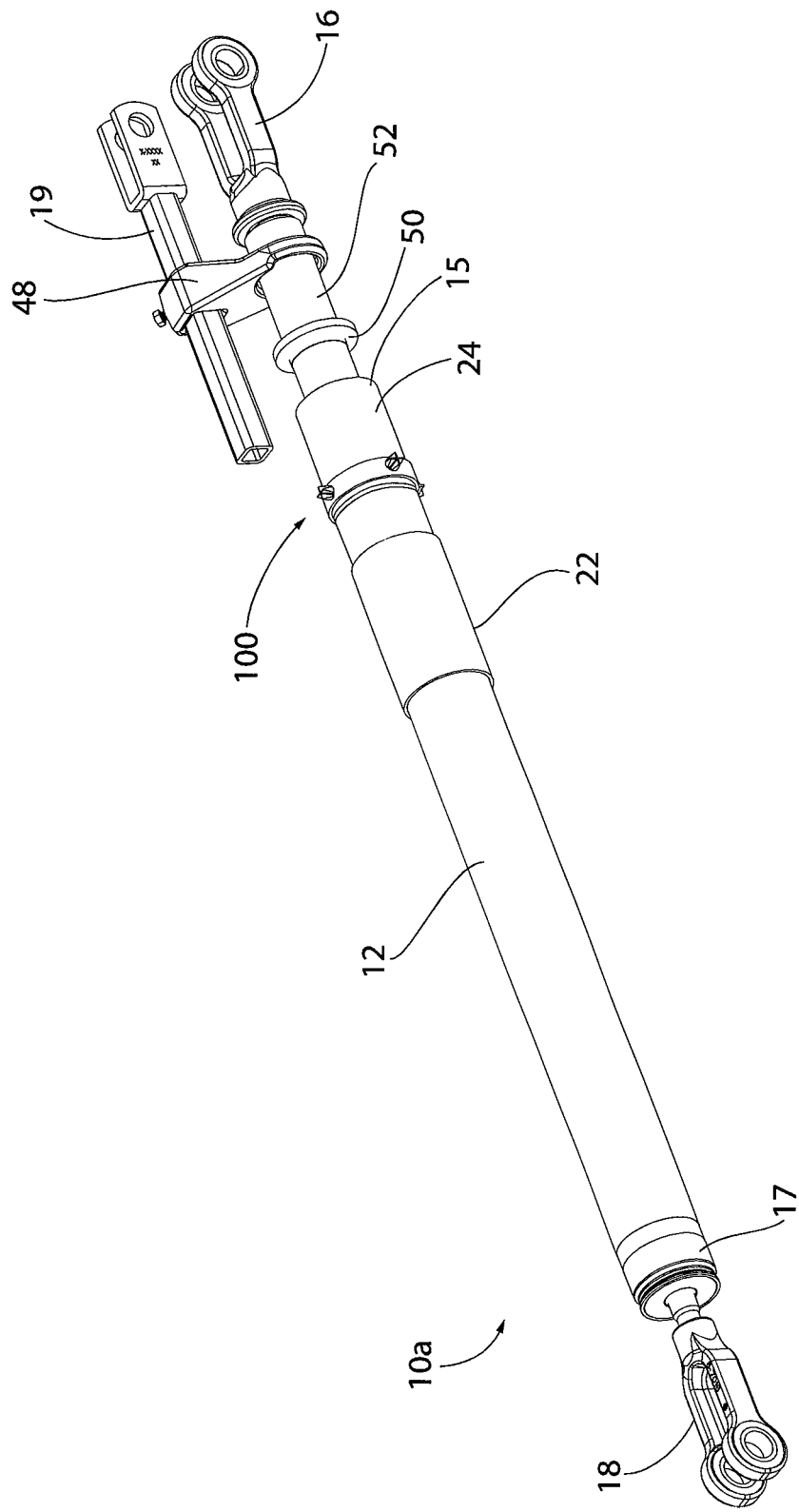
FIG. 1 is a perspective view of a double acting automatic slack adjuster for use with a brake rigging including a drainage system in accordance with an embodiment of the present disclosure.

For purposes of the description hereinafter, the terms "upper", "lower", "right", "left", "vertical", "horizontal", "top", "bottom", "lateral", "longitudinal", and derivatives thereof, shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

Figure 2:
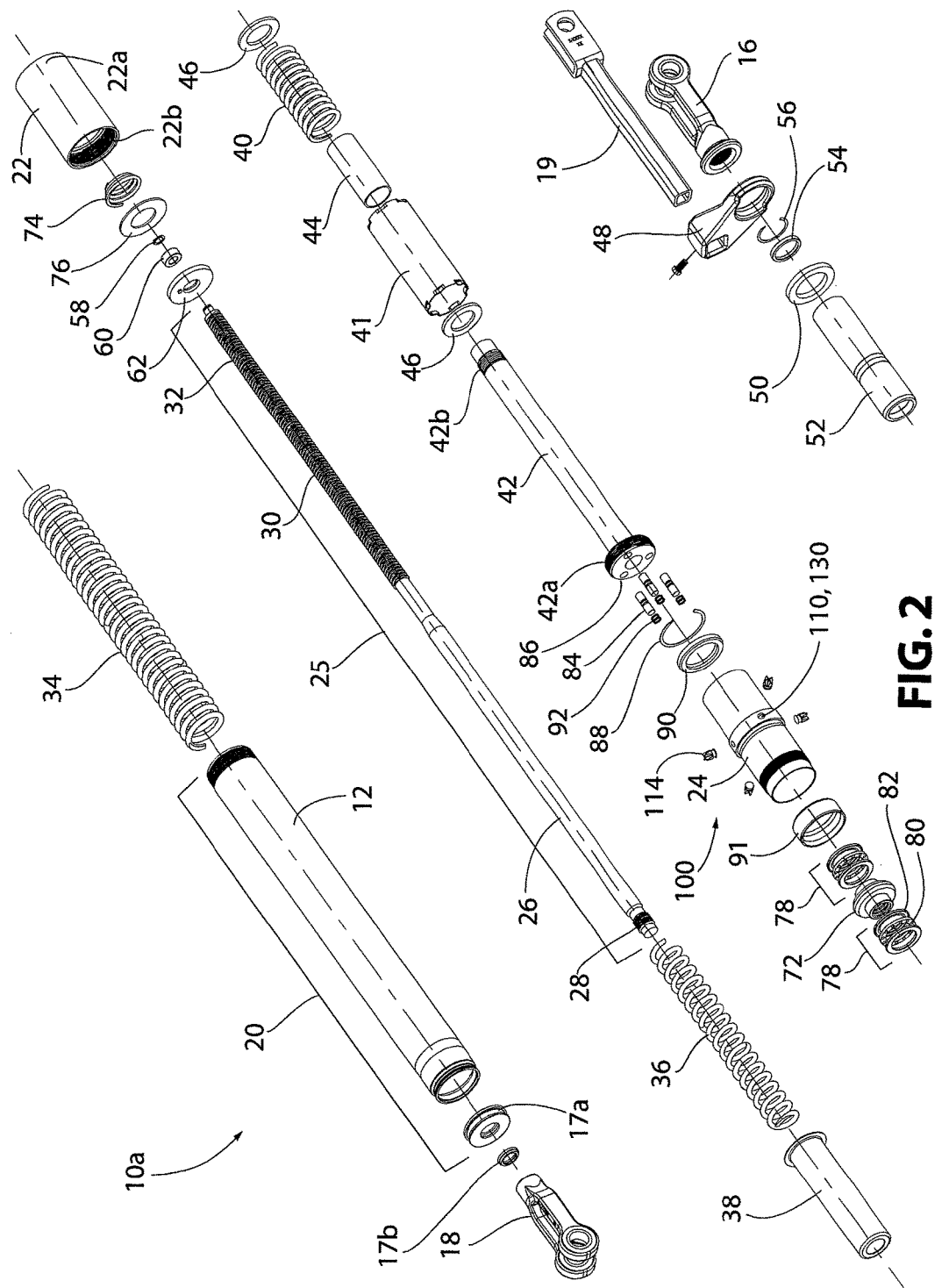
FIG. 2 is an expanded perspective view of the slack adjuster of FIG. 1, including the drainage system in accordance with an embodiment of the present disclosure.

Reference is now made to FIGS. 1 and 2 which show a double-acting slack adjuster, generally indicated as 10a, for use in a railway vehicle brake linkage, not shown, to automatically adjust the slack within the brake linkage caused by wear induced in the brake pads, wheels, and other components in the brake rigging during repeated braking applications. The slack adjuster includes a drainage system, generally indicated as 100, configured to allow fluid and/or contaminates to drain out of the slack adjuster 10a to reduce exposure of the critical operating area, generally indicated as 70, to fluid and/or contaminants. The slack adjuster critical operating area 70 is defined in detail below, but generally refers to the area including the components which operate together to adjust the brake rigging of the railcars as needed.

Referring back to FIGS. 1-2, the slack adjuster 10a includes an elongated hollow cylindrical housing member 12 which is restrained against rotation and pivotally connectable at a first end, generally indicated as 15 thereof, to the brake rigging with a front jaw 16 and pivotally connectable at a second end, generally indicated as 17 thereof, to the brake rigging with a rear jaw 18. The second end 17 of the housing member 12 includes a cap 17a and a seal 17b. The first end 15 of the housing member 12 also includes a control rod 19. The elongated cylindrical housing member 12 includes a main housing portion 20, a cone nut housing portion 22, and an overtravel housing portion 24. The slack adjuster 10a also includes a rod assembly 25 including an elongated rod member 26 positioned for reciprocal movement within the housing member 12 through the second end 17 of the housing member 12. The rod member 26 is restrained against rotation and pivotally connectable at a first end 28 thereof to the railway brake rigging by the rear jaw 18. The rod member has a threaded portion 30 adjacent a second end 32 that extends into the housing member 12 and through the second end 17 of the housing member 12. The housing member 20 can also include a decal or identification label 47, as shown in FIG. 10.

With continuing reference to FIGS. 1 and 2, and with reference to FIG. 3A, the slack adjuster 10a includes a critical operating area 70. This critical operating area 70 includes the components of the slack adjuster 10a which operate together to adjust the brake rigging. One example of a critical operating area is shown in FIGS. 2 and 3A, and includes a positioning member, such as a cone lock nut 72 that is located within the cone nut housing portion 22, and threadedly engaged with the threaded portion 30 of the elongated rod 26. The cone lock nut 72 rotates about the threaded portion 30 of the elongated rod 26 between respective first abutting engagement, disengagement, and second abutting engagement positions to change the length of the slack adjuster 10a by changing the relative longitudinal positions between the housing member 12 and the elongated rod 26.

The slack adjuster 10a also includes a first urging assembly which can include at least one main or first spring 34, an additional spring 36 located within a spring cup 38, and a conical spring 74, located within the critical operating area 70 for urging the cone lock nut 72 into a first position, such as a disengaged position, with respect to the housing member 12. The conical spring 74 can be caged between the cone lock nut 72 and a conical spring seat 76. It can be appreciated that the springs 34, 36 can be replaced with other types of urging members, such as pneumatic or hydraulic cylinders.

A second urging assembly is also provided which, according to one embodiment, can include a second spring or overtravel spring 40 located within an overtravel spring housing 41. The overtravel spring 40 is stronger than the first or main spring 34 so as to overcome the force applied by the first or main spring 34 and, therefore, urge the cone lock nut 72 into a second position. It can also be appreciated that, like the first urging assembly, a fluid operated cylinder may be used in place of the overtravel spring 40.

The overtravel housing portion 24 can also include a rod guide 42 threaded at a first end 42a and a second end 42b and configured for cooperating with the elongated rod 26 and overtravel spring 40. An overtravel sleeve 44 can be provided between at least a portion of the rod guide 42 and the overtravel spring 40. One or more washers 46 can be provided within the overtravel housing portion 24.

Other components located at the front end of the slack adjuster 10a include an overtravel sliding collar 48, an overtravel control ring swaging 50, and a machined tube 52. A wiper seal 54 and a retaining ring 56 may also be provided at this front end. Prior to the present disclosure, previous slack adjuster designs relied upon this wiper seal 54 to prevent water and contaminants from entering through the front end of the slack adjuster 10a and into the critical operating area 70 of the slack adjuster 10a. However, in situations where the slack adjuster is exposed to a large amount of water, this wiper seal 54 may be insufficient to prevent the entrance of water and/or contaminants from entering into the critical operating area 70 and causing operational problems with the components located therein which operate together to adjust the brake rigging of the railcar. These operational problems could occur if dirt or other foreign objects become trapped between the moving parts of the components or if any accumulated water surrounding the components freezes, which would inhibit and/or otherwise prevent the normal movement of the components with respect to one another.

Referring, in particular, to FIGS. 2 and 3A, in addition to the cone lock nut 72, conical spring 74, and conical spring seat 76, the critical operating area 70 includes bearing assemblies, generally indicated as 78, including a bearing 80 cooperating with race 82, which are located on both sides of the cone lock nut 72. Also included in the critical operating area 70 is one or more trigger pins 84 located within apertures 86 extending into the first end 42a of the rod guide 42, a retaining ring 88, an overtravel housing portion seal 90, and a front cone 91.

In operation, the cone lock nut 72, the bearing assemblies 78, and the conical spring 74 cooperate together to change a length of the slack adjuster 10a by changing a relative longitudinal position between the main housing portion 20 and the elongated rod 26 located within the main housing portion. The cone nut housing portion 22 is positioned between the overtravel housing portion 24 and the main housing portion 20. The cone nut housing portion 22 includes a first end 22a positioned adjacent to the overtravel housing portion 24 and a second end 22b positioned adjacent to the main housing portion 20. As shown in FIG. 2, the cone nut housing portion 22 can include a retaining ring 58, a collet 60, and a washer 62. The first end 22a and the second end 22b can also include threads 22c, 22d, respectively, that are configured to cooperate with threads on the main housing portion 20.

The present disclosure is directed to a drainage system, generally indicated as 100, associated with the overtravel housing portion 24. The drainage system 100 allows fluid, such as water, and other contaminants, such as dirt and/or debris, to drain out of the slack adjuster 10a to prevent this fluid and/or contaminants from accumulating within the slack adjuster 10a and from contacting the critical operating area 70 of the slack adjuster 10a. Specifically, the disclosure provides an area for the accumulation and drainage of water, miscellaneous debris, and other contaminants to prevent accumulation and distribution of this material inside the slack adjuster 10a. The present disclosure also provides a drainage point for miscellaneous contaminants that breach the wiper seal 54, discussed in detail above. The presence of water and/or debris in the critical operating area 70 can interfere with the operation of the slack adjuster 10a.

Reference is now made to FIGS. 3A and 3B which show the drainage system 100 in accordance with one embodiment of the disclosure. The drainage system 100 includes at least one aperture 110 extending through a sidewall portion 112 of the overtravel housing portion 24. The aperture 110 is configured to form a direct egress for the fluid and/or contaminates to drain therethrough and to reduce exposure of the critical operating area 70 to fluid and/or contaminants. Multiple apertures 110 can be located about and extending through the sidewall portion 112 of the overtravel housing portion 24.

Figure 6:
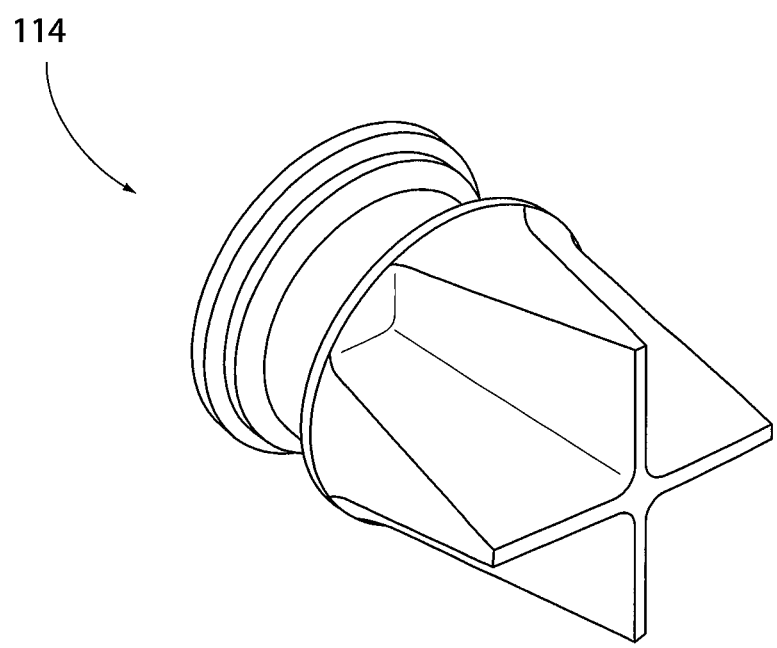
FIG. 6 shows a bottom perspective view of a one-way valve that can be used in the drainage system in accordance with an embodiment of the present disclosure.

A plug 114, as shown in detail in FIG. 6, can be provided in the apertures 110. The plug 114 can be in the form of a one-way valve and each of the apertures 110 can include a plug or one-way valve therein. The use of a one-way valve 114 allows for drainage from the drainage area and provides a means to prevent any contaminants from entering back through the drainage area. According to one embodiment, one or more of the plugs 114 can be removed, such as the plug 114 facing downward, after installation of the slack adjuster assembly in the brake rigging. This would allow for quicker, unrestricted drainage of the water and/or contaminants from the drainage area of the slack adjuster 10a.

Figure 4A:
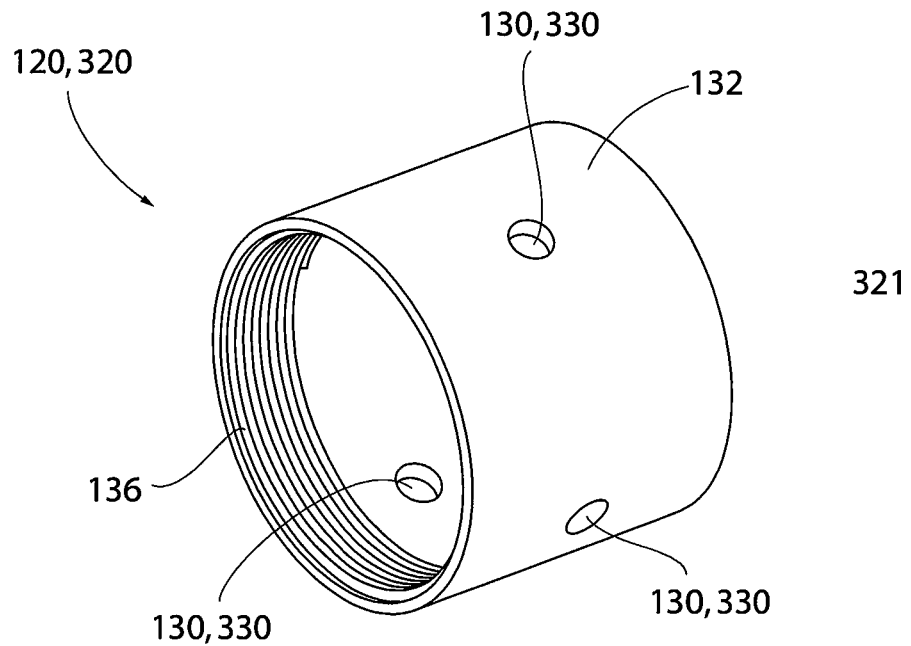
FIG. 4A is a perspective view of a plug housing for use with the drainage system in accordance with an embodiment of the present disclosure.
Figure 4B:
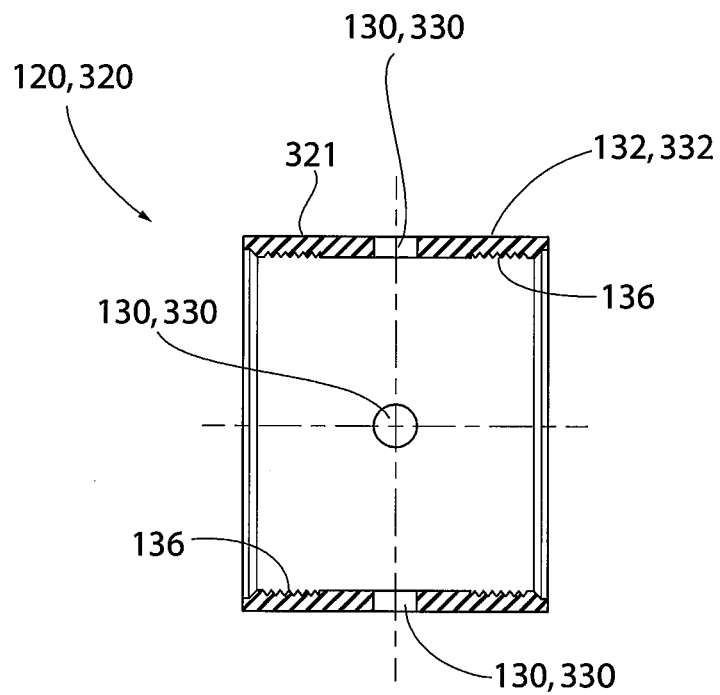
FIG. 4B is a cross-sectional side view of the plug housing of FIG. 4A in accordance with an embodiment of the present disclosure.
Figure 5A:
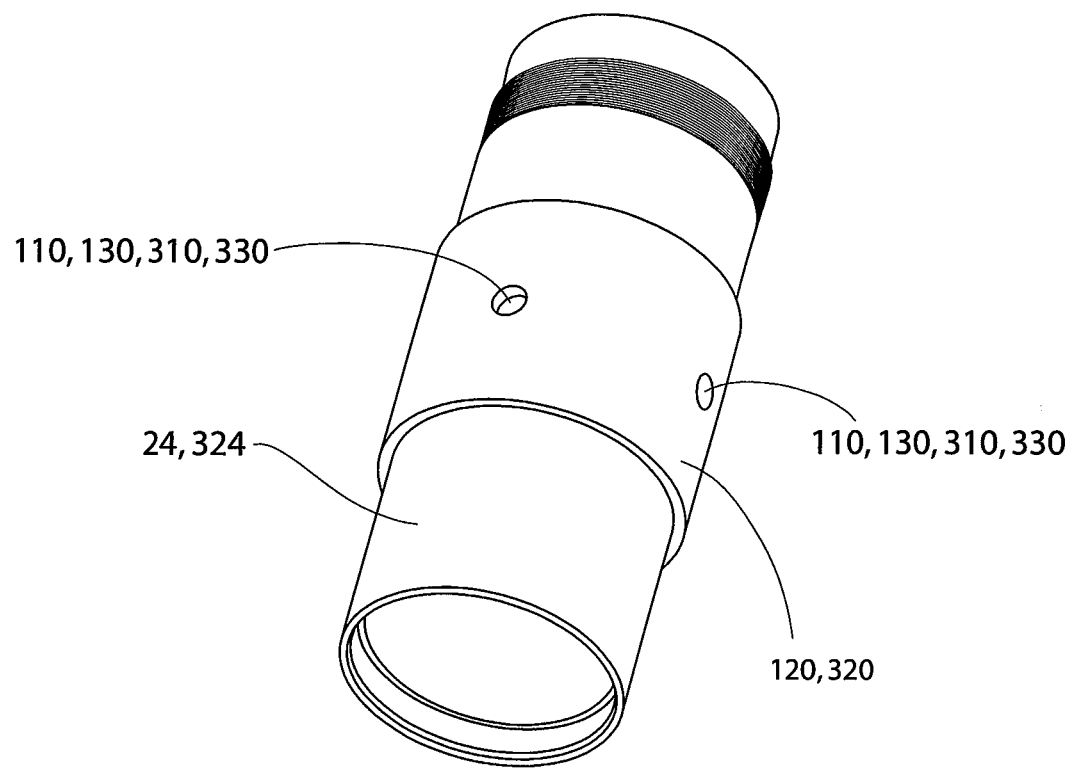
FIG. 5A is a perspective view of a the drainage system including a portion of the overtravel housing assembly/plug housing in accordance with an embodiment of the present disclosure.
Figure 5B:
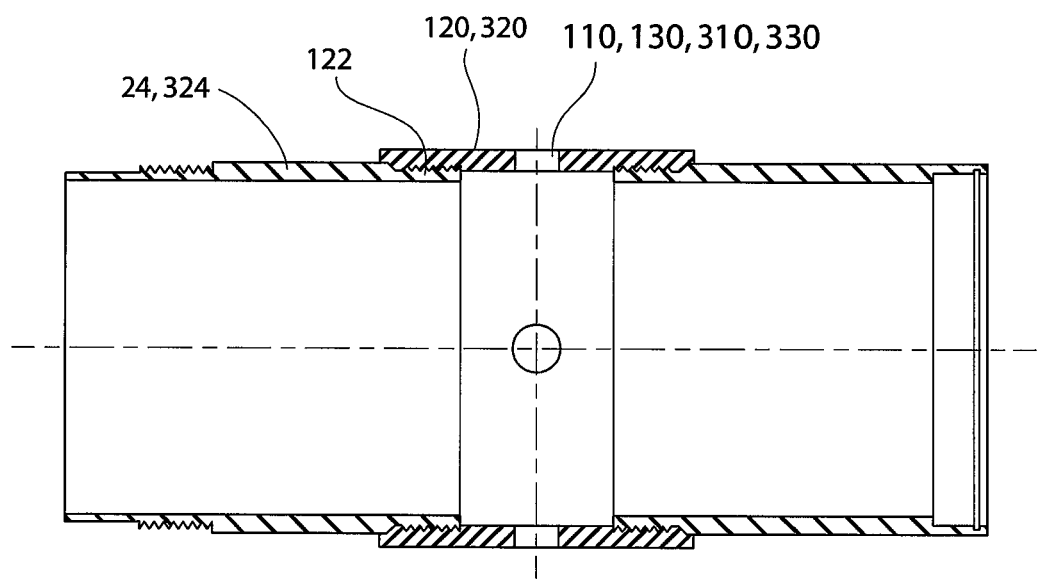
FIG. 5B is a cross-sectional side view of the drainage system of FIG. 5A in accordance with an embodiment of the present disclosure.

According to one design, a plug housing, generally indicated as 120 in FIGS. 4A and 4B, can be provided that encompasses at least a portion 122 of the overtravel housing portion 24, as shown in FIGS. 5A and 5B. The plug housing 120 includes at least one aperture 130, or a plurality of apertures 130, extending through a sidewall portion 132 in alignment with the at least one aperture 110 extending through the sidewall portion 112 of the overtravel housing portion 24. The plug housing 120 can include threads 136 for threadedly engaging threads 138 on a portion of the overtravel housing portion 24. In this design, the plug or one-way valve 114 extends through the aligned apertures 110, 130. The plug or one-way valves 114 can be removable so that after installation of the slack adjuster 10a in the brake rigging, one or more of the plugs 114 can be removed, such as the plug 114 facing downward. It can be appreciated that multiple plugs or one-way valves 114 can be provided about and extending through the sidewall of the overtravel housing portion and that all of the plugs or one-way valves 114 can be removable. Using multiple removable plugs 114 aids in the installation of the slack adjuster 10a in that depending upon the orientation of the plugs or one-way valves after installation, the bottom most or two bottom most plugs or one-way valves 114 can be removed.

Figure 7:
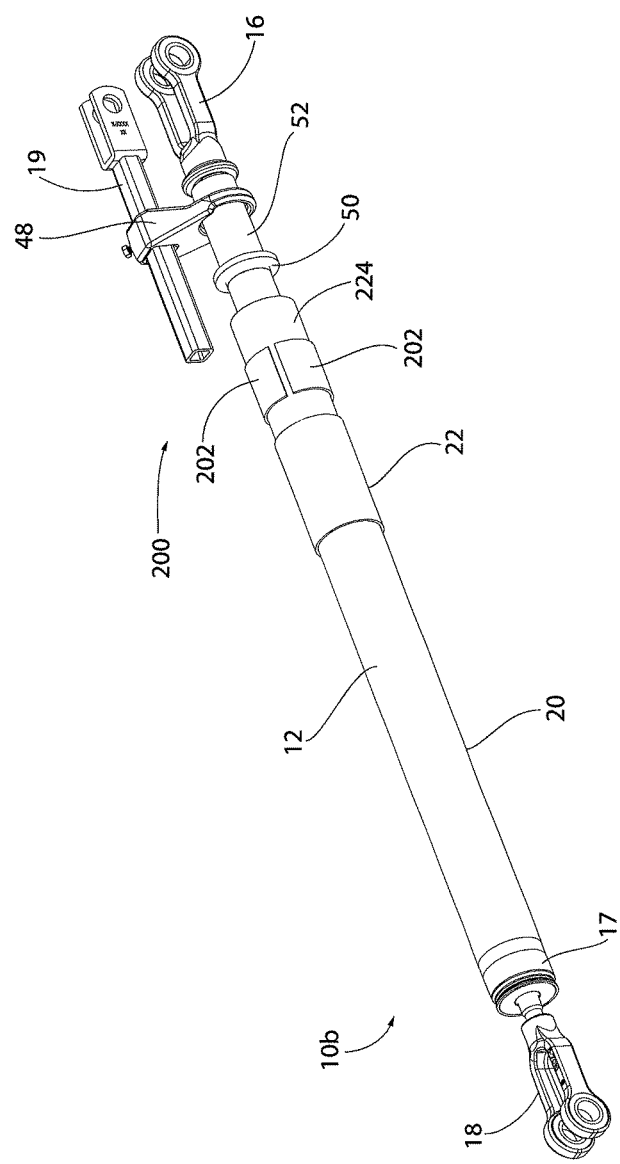
FIG. 7 is a perspective view of a double acting automatic slack adjuster for use with a brake rigging including a drainage system in accordance with another embodiment of the present disclosure.
Figure 8:
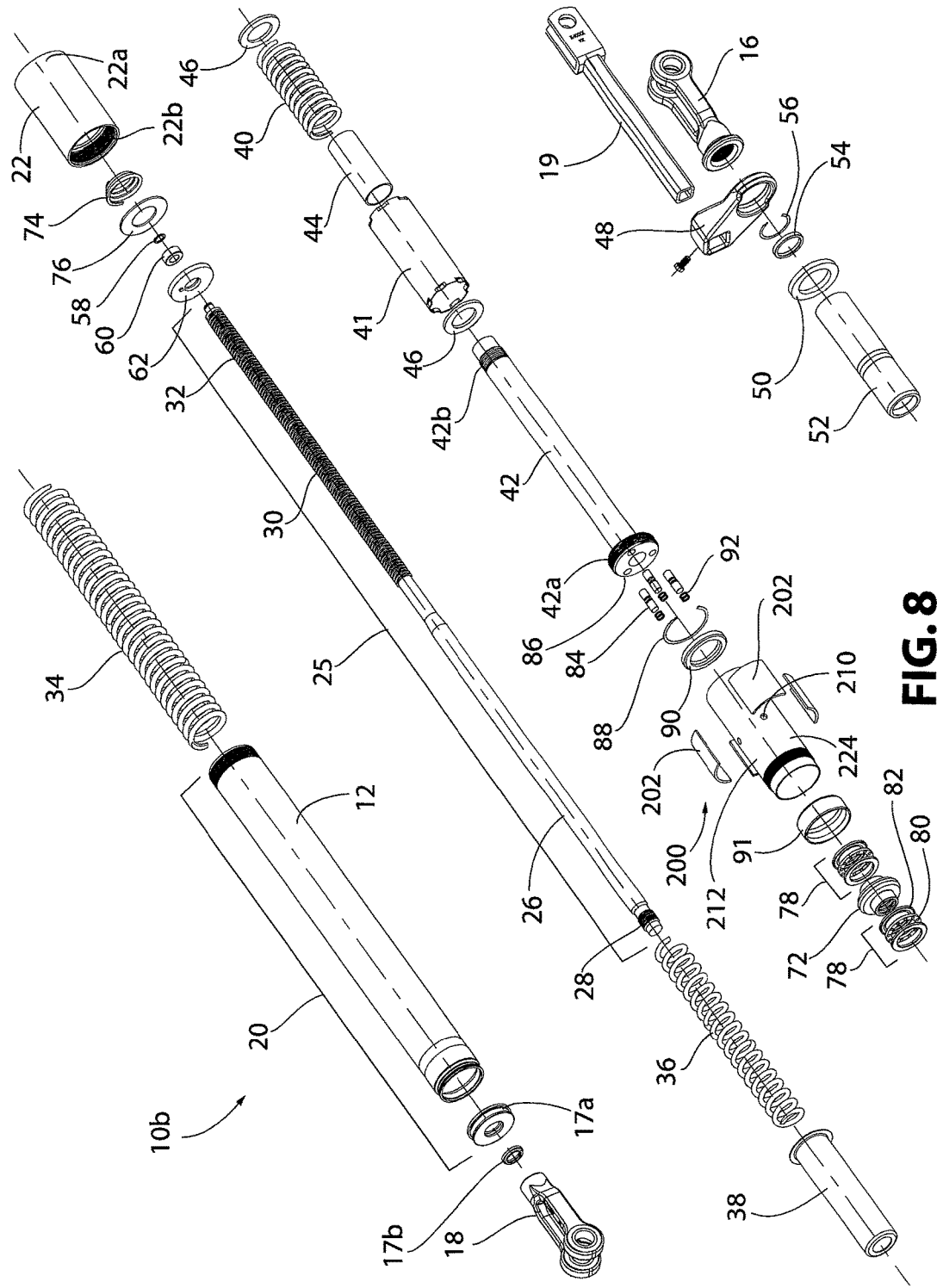
FIG. 8 is an expanded perspective view of the slack adjuster of FIG. 7, including the drainage system in accordance with an embodiment of the present disclosure.

Reference is now made to FIGS. 7-8 which show a double-acting automatic slack adjuster, generally indicated as 10b, for use with a brake rigging including a drainage system, generally indicated as 200, in accordance with another embodiment of the present disclosure. In this design, the at least one aperture 210 is provided in the overtravel housing sidewall portion 212. The sidewall portion 212 of the overtravel housing portion, through which the at least one aperture 210 extends, comprises the cylindrical housing 224 or a tubular member having a first end positioned adjacent the front jaw 16 of the slack adjuster and a second end positioned adjacent the cone nut housing portion 22. According to one design, multiple apertures 210, such as four apertures positioned equidistant about the periphery of the cylindrical housing 224, can be provided which extend through the sidewall portion 212 of the overtravel housing 224. The provision of multiple apertures 210 in the overtravel housing 224 enable multiple drainage points for the slack adjuster 10b and also aids in the installation of the slack adjuster 10b as it allows for multiple rotational orientations of the overtravel housing portion 224. A patch 202, or multiple patches 202 can be provided which are configured for covering the apertures 210. After installation, the user would remove one or two of the patches 202 facing the most downward position. This will allow the water and/or contaminants to drain out of the slack adjuster 10b. The remaining patches 202 can be left covering the apertures 210 to protect the apertures 210 and prevent any water and/or contaminants from entering into the slack adjuster 10b. One material that can be used to form the patches 202 can be 3M® FRA Railcar tape, which is common in the freight industry and is typically used for FRA regulations on railcars and locomotives. It can be appreciated that other materials and/or tapes can be used to form the patches 202 as long as the material has sufficient strength and holding characteristics capable of withstanding the environmental and mechanical conditions to which it will be exposed. It can also be appreciated that any combination of plugs 114, one-way valves, and/or patches 202 can be used to sealingly and/or removably engage the apertures 110, 210.

Figure 9:
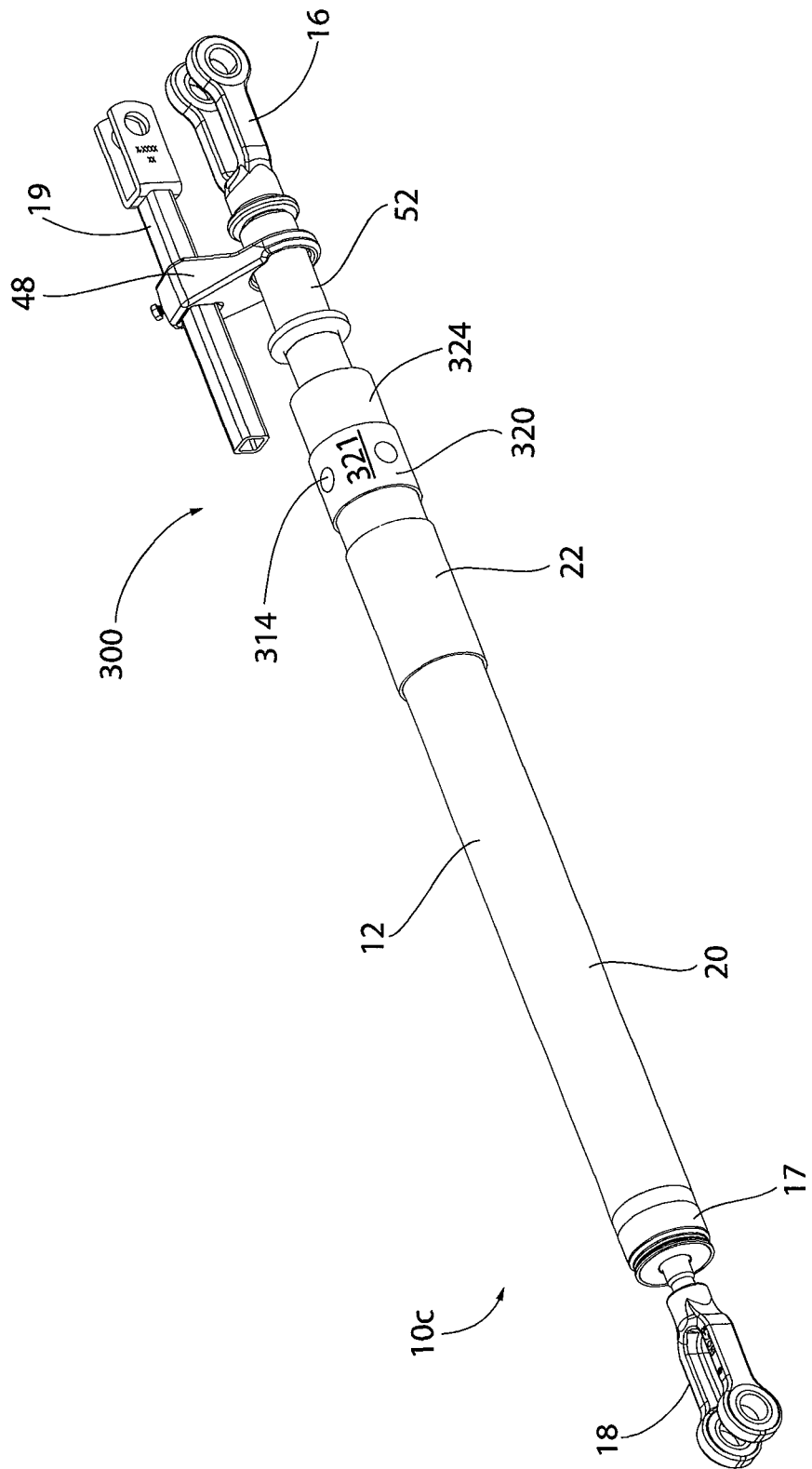
FIG. 9 is a perspective view of a double acting automatic slack adjuster of for use with a brake rigging, including a drainage system, in accordance with yet another embodiment of the present disclosure.

Reference is now made to FIGS. 9-10 which show a double-acting automatic slack adjuster, generally indicated as 10c, for use with a brake rigging, including a drainage system generally indicated as 300, in accordance with yet another embodiment of the present disclosure. In this design, a plug housing 320, similar in design to plug housing 120, as shown in FIGS. 4A and 4B, is fitted about the overtravel housing 324, such as shown in FIGS. 5A and 5B. The overtravel housing 324 includes at least one aperture 310 extending through a sidewall portion 312. The plug housing includes at least one aperture 330 in alignment with the at least one aperture 310 of the overtravel housing 324. This at least one aligned aperture 310, 330 forms a direct egress for the fluid and/or contaminants to drain therethrough and out of the overtravel housing assembly 324 to reduce exposure of the critical operating area 70 of the slack adjuster 10c, as illustrated in FIG. 3A. It can be appreciated that multiple apertures or a continuous aperture 310 extending about the circumference of the overtravel housing 324 and through the sidewall 312 can be provided. Instead of the plug or one-way valve 114, shown in FIGS. 1-2 and 6, a rounded, low-profile button shaped plug 314, as shown in detail in FIGS. 11A and 11B, may be provided in the apertures 310.

Figure 11B:
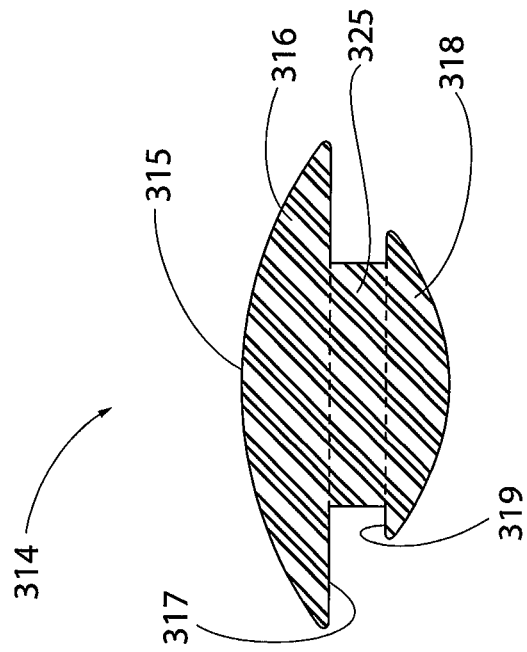
FIG. 11B is a cross-sectional side of the plug of FIG. 11A in accordance with an embodiment of the present disclosure.
Figure 11A:
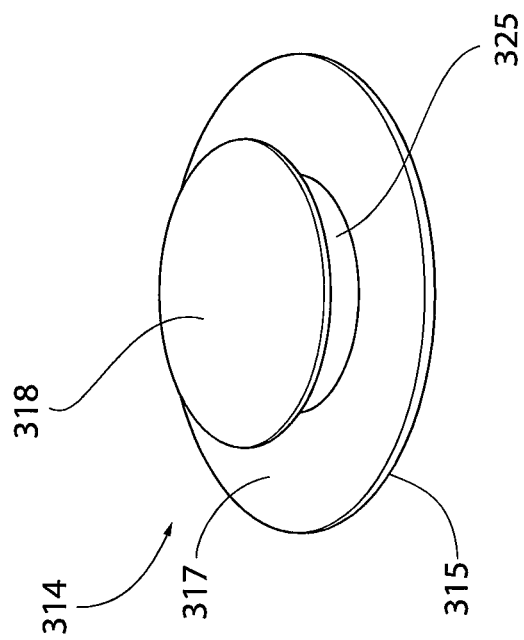
FIG. 11A is a bottom perspective view of the plug that can be used in the drainage system in accordance with an embodiment of the present disclosure.

With continuing reference to FIGS. 11A and 11B, the rounded, low-profile button shaped plug 314 can have a top portion 316 having a bottom face 317 configured for cooperating with an exterior surface 321 of the sidewall portion 332 of the plug housing 320, a bottom portion 318 having a top face 319 configured for cooperating with an interior surface 323 of the plug housing 320 and/or the overtravel housing 324 and a connecting portion 325 extending between and connecting the top portion 316 to the bottom portion 318. The connecting portion 325 is configured to be positioned within the apertures 310, 330 in the plug housing 320 and the overtravel housing 324. According to the embodiment shown in FIGS. 11A and 11B, the top portion 316 can have a larger diameter than the bottom portion 318, however, this embodiment is not meant to be limiting as the top portion 316 and bottom portion 318 can have any diameter as needed so as to adequately anchor the button shaped plug within the apertures of the plug housing 320 and/or the overtravel housing 324, while providing a sufficient grasping surface to enable its removal from the apertures 330, 310 of the plug housing 320 and/or the overtravel housing 324. However, it can be appreciated that the connecting portion 325 should have a diameter which sufficiently seals within the aperture 330, 310 of the plug housing 320 and/or overtravel housing 324.

The use of the rounded, low-profile button shaped plug 314 has several advantages, especially in terms of stacking, packaging, and shipping, as the rounded, low-profile shape enables the slack adjusters 10c to be easily stacked on one another, as there is less chance of the plugs 314 being damaged or broken off, as the top surface 315 of the button shaped plug 314 has a low-profile that rests close to the exterior surface of the sidewall portion 312 of the overtravel housing 324.

In addition to the drainage system 100, 200 of the disclosure, various sealing members can be used which are configured to cooperate with the cone nut housing portion 22, such as with the at least one of the first end 22a and the second end 22b of the cone nut housing portion 22, to prevent any fluid and/or contaminants from entering in the critical operating area 70 of the slack adjuster 10a, 10b, 10c These sealing members can include O-rings 92 located about the trigger pins 84, the overtravel housing seal 90, the retaining ring 88, or various sealing material or O-rings (not shown) associated with the conical spring 74 or conical spring seat 76. It can be appreciated that the sealing members can be any known sealing members including gaskets, O-rings, rubber sealant material, adhesive sealing compound, and the like. It also can be appreciated that the gaskets, O-rings, sealant material, and adhesive sealing compound can be formed from any known material. Examples of O-ring material that can be used to include ethylene propylene diene monomer (EPDM), nitrile, fluoroelastomers such as Viton® or FKM, silicone and the like.

Figure 12A:
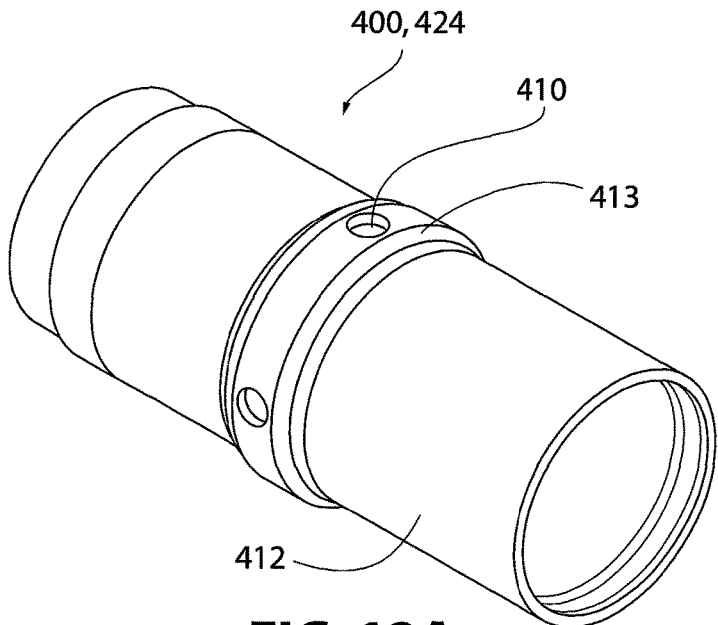
FIG. 12A is a perspective view of a drainage system, including a one-piece overtravel housing member, in accordance with an embodiment of the present disclosure.
Figure 12C:
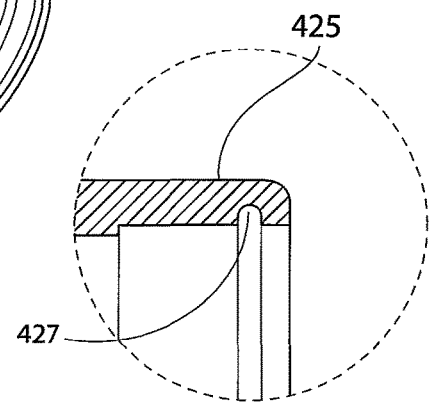
FIG. 12C is an enlarged cross-sectional view of detail C of FIG. 12B in accordance with an embodiment of the present disclosure.
Figure 12B:
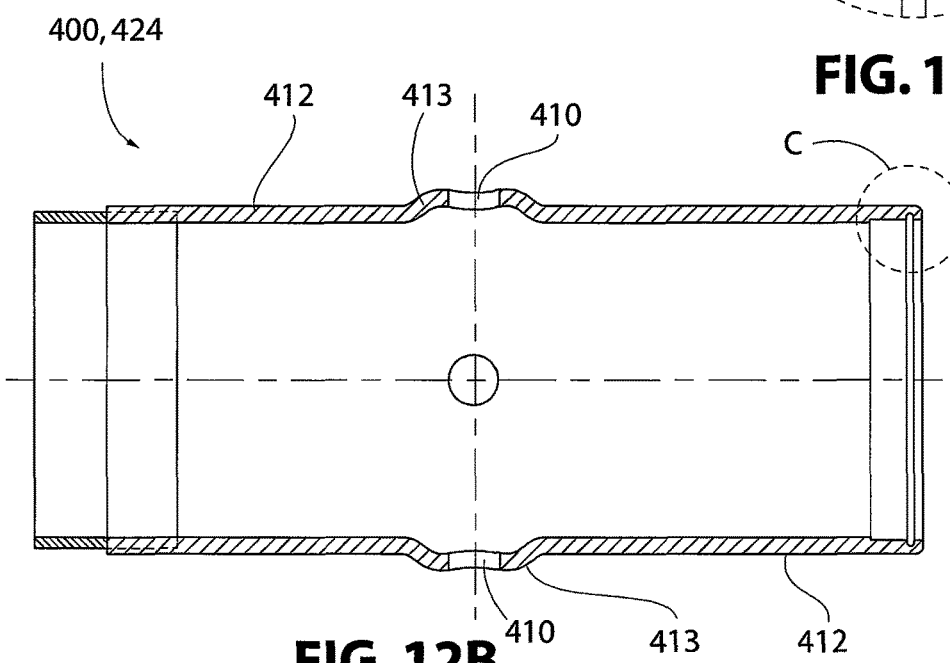
FIG. 12B is a cross-sectional side view of the drainage system of FIG. 12A in accordance with an embodiment of the present disclosure.

Reference is now made to FIGS. 12A-12C which show a drainage system, generally indicated as 400, in accordance with an embodiment of the disclosure, including a one-piece overtravel housing member 424. The overtravel housing member 424 includes at least one aperture 410 extending through a sidewall portion 412 thereof. The aperture 410 is configured to form a direct egress for the fluid and/or contaminates to drain therethrough and to reduce exposure of the critical operating area 70 to fluid and/or contaminants. Multiple apertures 410 can be located about, and extending through, the sidewall portion 412 of the overtravel housing portion 424. According to one embodiment, the apertures 410 can be located at approximately 90° intervals about the circumference of the overtravel housing member 424.

According to the embodiment shown in FIGS. 12A and 12B, a portion 413 of the sidewall portion 412, which includes the apertures 410, can have a greater diameter or extend beyond the plane of the remaining sidewall portion 412. It can be appreciated that the overtravel housing portion 424 can be formed and fabricated by any known technique including forging or casting.

It can be appreciated that any of the plugs 114, 314, the one-way valve, or a patch 202 may be provided for sealingly engaging one or more of the apertures 410. One or more of the plugs 114, 314 or patches 202 can be removed from the apertures 410 of the overtravel housing mechanism 424 to allow fluid and/or contaminants to drain therefrom and away from the critical operating area 70 of the slack adjuster. According to one embodiment, the plugs 114, 314 and/or patches 202 can be removed from the most downwardly facing apertures 410. It can be appreciated that any combination of plugs 114, 314, one-way valves, and/or patches 202 can be used to sealingly and/or removably engage the apertures 410.

Referring now to FIG. 12C, an end portion 425 of the overtravel housing portion 424 can include a notch 427 configured to matingly engage the cone nut housing portion 22. Likewise, the cone nut housing portion 22 can have a protrusion (not shown) configured to cooperate with the notch 427 of the overtravel housing. It can be appreciated that the end portion 425 of the overtravel housing portion 424 can include a protrusion (not shown) configured to matingly engage a protrusion (not shown) in the cone nut housing portion 22. The provision of a notch/protrusion arrangement would allow for a snap fit of the overtravel housing portion 424 with the cone nut housing portion 22. In another embodiment, the end portion 425 of the overtravel housing portion 424 can include threads for threadedly engaging the cone nut housing portion 22.

Referring back to FIGS. 1-2, 3A, and 3B, a method of preventing the accumulation of water and/or contaminants within a slack adjuster 10a is provided for protecting a critical operating area 70 of the slack adjuster 10a. The slack adjuster 10a includes a main housing portion 20, a cone nut housing portion 22 enclosing the critical operating area 70 of the slack adjuster 10a, and an overtravel housing portion 24. The method includes providing at least one drainage system 100, wherein the drainage system includes at least one aperture 110 extending through a sidewall portion 112 of the overtravel housing portion 24. The at least one aperture 110 is configured to allow fluid and/or contaminants to drain therethrough to reduce exposure of the critical operating area to fluid and/or contaminants. It can be appreciated that the above description is not limited to the slack adjuster 10a, but is also applicable to the slack adjuster 10b of FIGS. 7-8 and 10c of FIGS. 9-10, as well as, any one or a combination of variations and designs as discussed in detail above.

The method further includes applying at least one of a plug or one-way valve 114 or a patch 202 to sealingly engage the at least one aperture 110. According to one design as shown in FIGS. 11A-11B, the plug can be a rounded, low-profile, button shaped, member 314. The method can also include providing a plurality of apertures 110 located about the periphery and extending through the sidewall portion 112 of the overtravel housing 24. Upon installation, the method can include removing at least one of the plugs and/or the patches cooperating with the downwardly facing apertures 110 to allow fluid and/or contaminants to drain from the slack adjuster 10a. According to the design shown in FIGS. 12A-12C, the overtravel housing portion 424, including the at least one aperture 410, can be formed as a one-piece member. According to another design shown in FIGS. 4A-4B, a plug housing 120, 320 including at least one aperture 130, 330 extending through a sidewall 132, 332 thereof, can be provided. The method also includes positioning the plug housing 120, 320 about a portion of the overtravel housing portion 24, 324 such that the at least one aperture 130, 330 in the plug housing 120, 320 is aligned with the at least one aperture 110, 310 extending through the sidewall portion 112, 312 of the overtravel housing 24, 324.

While the present disclosure is satisfied by embodiments in many different forms, there is shown in the drawings, and described herein in detail, the preferred embodiments of the disclosure, with the understanding that the present disclosure is to be considered as exemplary of the principles of the disclosure and is not intended to limit the disclosure to the embodiments illustrated. Various other embodiments will be apparent to and readily made by those skilled in the art without departing from the scope and spirit of the disclosure. The scope of the disclosure will be measured by the appended claims and their equivalents.

What is claimed is:

1. A drainage system for use with a slack adjuster for a railway brake rigging, said slack adjuster including a main housing portion, a cone nut housing portion enclosing a critical operating area of the slack adjuster comprising components configured to operate together to adjust the brake rigging, and an overtravel housing portion, said drainage system including a plurality of apertures extending through a sidewall portion of the overtravel housing portion, at least one of the plurality of apertures configured to allow fluid and/or contaminants to drain therethrough to reduce exposure of the critical operating area to fluid and/or contaminants, and wherein the sidewall portion of the overtravel housing portion, through which the apertures extend, comprises a tubular member having a first end positioned adjacent a front jaw of the slack adjuster and a second end positioned adjacent the cone nut housing portion.

2. The system of claim 1, wherein the operating area includes a cone nut, at least one bearing race assembly, and a conical spring, all of which are configured to cooperate together to change a length of the slack adjuster by changing a relative longitudinal position between the main housing portion and a rod member located within the main housing portion.

3. The system of claim 1, including at least one of a plug, one-way valve and a patch configured for cooperating with the at least one of the plurality of apertures.

4. The system of claim 3, wherein the plug comprises a rounded low-profile plug extending through the at least one aperture.

5. The system of claim 3, wherein the at least one plug or patch is removable upon installation of the slack adjuster in the brake rigging.

6. The system of claim 1, wherein each of the apertures include at least one of a plug, a one-way valve, and a patch configured for cooperating with each of the apertures.

7. The system of claim 6, wherein the plug comprises a rounded low-profile plug.

8. The system of claim 1, including a plug housing encompassing at least a portion of the overtravel housing portion, said plug housing including at least one aperture extending through a sidewall portion in alignment with the at least one aperture extending through the sidewall portion of the overtravel housing portion.

9. The system of claim 8, wherein the plug housing includes threads for threadedly engaging a threaded portion of the overtravel housing portion.

10. The system of claim 8, including at least one of a plug, one-way valve and a patch configured for cooperation with the aligned apertures.

11. The system of claim 10, wherein the plug comprises a rounded low-profile plug.

12. The system of claim 8, wherein the at least one aperture extending through the overtravel housing sidewall portion and the at least one aperture extending through the plug housing sidewall portion comprises multiple apertures aligned with one another, and wherein each of the aligned apertures include at least one of a plug, a one-way valve, and a patch cooperating with the aligned apertures.

13. The system of claim 1, including at least one of a plug and a patch for sealing or covering each of said apertures, and wherein at least one of the plugs and the patches sealing or covering the downwardly facing apertures is removable to allow for fluid and/or contaminants to drain from the slack adjuster.

14. The system of claim 1, wherein the overtravel housing portion, including the at least one aperture, is a one-piece formed member.

15. The system of claim 14, wherein an end portion of the overtravel housing portion includes one of a notch and a protrusion configured to matingly engage the cone nut housing portion.

16. The slack adjuster of claim 14, wherein the plurality of apertures enable multiple drainage points allowing for multiple rotational orientations of the overtravel housing portion and the slack adjuster.

17. The system of claim 1, wherein the at least one of the plurality of apertures extending through the sidewall portion of the overtravel housing portion is configured to allow fluid and/or contaminants located within an interior portion of the slack adjuster to drain therethrough and out of the slack adjuster.

18. The system of claim 1, wherein the plurality of apertures enable multiple drainage points allowing for multiple rotational orientations of the overtravel housing portion and the slack adjuster.

19. A double-acting tension actuatable slack adjuster to adjust the slack in a railway vehicle brake linkage, said slack adjuster comprising:
(a) an elongated hollow cylindrical housing member which is restrained against rotation and pivotally connectable at a first end thereof, said elongated hollow cylindrical housing including a main housing portion, a cone nut housing portion, and a overtravel housing portion;
(b) an elongated rod member which is restrained against rotation and pivotally connectable at a first end thereof, said rod member having at least a portion thereof threaded, said threaded portion of said rod member extending into said housing member through a second end of said housing member;
(c) a cone lock nut threadedly engaged with said threaded portion of said rod member intermediate a first and second end thereof, said cone lock nut axially movable for rotating about said threaded portion of said rod member to change the length of said slack adjuster by changing the relative longitudinal position between said housing member and said rod member, said cone lock nut being located within the cone nut housing portion;
(d) at least a first spring for urging said cone lock nut into a first position with respect to said housing member;
(e) a second spring for overcoming a force applied by said first spring and for urging said cone lock nut into a second position; and
(f) a plurality of apertures extending through a sidewall portion of the overtravel housing portion, at least one of said plurality of apertures configured to allow fluid and/or contaminants to drain therethrough to reduce exposure of a critical operating area of the slack adjuster to fluid and/or contaminants, and wherein the sidewall portion of the overtravel housing portion, through which the apertures extend, comprises a tubular member having a first end positioned adjacent a front jaw of the slack adjuster and a second end positioned adjacent the cone nut housing portion.

20. The slack adjuster of claim 19, including at least one of a patch, plug, and one-way valve configured for cooperating with said at least one of the plurality of apertures.

21. The slack adjuster of claim 20, wherein the plug is a rounded low-profile plug.

22. The slack adjuster of claim 19 including a plug housing configured to encompass a portion of the overtravel housing, said plug housing including at least one aperture in alignment with the at least one aperture extending through the sidewall portion of the overtravel housing.

23. The slack adjuster of claim 19, wherein the overtravel housing portion, including the at least one aperture, is a one-piece formed member.

24. A method of preventing the accumulation of water and/or contaminants within a slack adjuster and for protecting a critical operating area of the slack adjuster, said slack adjuster including a main housing portion, a cone nut housing portion enclosing the critical operating area of the slack adjuster, and an overtravel housing portion, said method comprising providing a plurality of apertures extending through a sidewall portion of the overtravel housing portion, at least one of the plurality of apertures configured to allow fluid and/or contaminants to drain therethrough to reduce exposure of the critical operating area to fluid and/or contaminants, and wherein the sidewall portion of the overtravel housing portion, through which the apertures extend, comprises a tubular member having a first end positioned adjacent a front jaw of the slack adjuster and a second end positioned adjacent the cone nut housing portion.

25. The method of claim 24, including applying at least one of a plug, patch, and a one-way valve to said at least one of the plurality of apertures.

26. The method of claim 25, wherein the plug comprises a rounded low-profile member.

27. The method of claim 24, wherein the plurality of apertures include a plug or patch and wherein the method further comprises removing at least one of the plugs and patches cooperating with the downwardly facing apertures to allow fluid and/or contaminants to drain from the slack adjuster.

28. The method of claim 24, wherein the overtravel housing portion including the at least one aperture, is formed as a one-piece member.

29. The method of claim 24, including providing a plug housing including at least one aperture extending through a sidewall thereof and positioning the plug housing about a portion of the overtravel housing, such that the at least one aperture in the plug housing is aligned with the at least one aperture extending through the sidewall portion of the overtravel housing.

30. The method of claim 24, wherein the plurality of apertures enable multiple drainage points allowing for multiple rotational orientations of the overtravel housing portion and the slack adjuster.

31. The method of claim 24, wherein the slack adjuster is fitted within a railway vehicle braking system at any rotational orientation and the plurality of apertures include a plug or patch and wherein the method further comprises removing at least one of the plugs and patches cooperating with the downwardly facing apertures to allow fluid and/or contaminants to drain from the slack adjuster.

\* \* \* \* \*